US005452829A

United States Patent [19]
King et al.

[11] Patent Number: 5,452,829
[45] Date of Patent: Sep. 26, 1995

[54] INTEGRATED LENS AND HOLSTER ASSEMBLY

[75] Inventors: Jeffrey S. King, Boynton Beach; Randall S. Pennington, Palm City; Dan R. Blanton, Boca Raton, all of Fla.

[73] Assignee: Motorola, Inc., Schaumburg, Ill.

[21] Appl. No.: 154,319

[22] Filed: Nov. 18, 1993

[51] Int. Cl.[6] .................................................. B65D 25/04
[52] U.S. Cl. ........................ 224/252; 224/242; 224/269; 455/351
[58] Field of Search ................................ 224/252, 231, 224/242, 269, 271, 191, 230, 247, 253, 907; 206/305, 38, 493; 24/3 F, 3 L; 455/347, 351

[56] References Cited

U.S. PATENT DOCUMENTS

| | | | |
|---|---|---|---|
| 4,083,481 | 4/1978 | Selinko | 224/252 |
| 4,420,078 | 12/1983 | Belt et al. | 224/253 |
| 4,654,631 | 3/1987 | Kurcbart et al. | 224/269 |
| 4,836,256 | 6/1989 | Meliconi | 206/305 |
| 4,896,805 | 1/1990 | Klaczak et al. | 224/253 |
| 5,025,921 | 6/1991 | Gasparaitis et al. | 455/351 |
| 5,097,997 | 3/1992 | Kipnis et al. | 224/253 |
| 5,175,873 | 12/1992 | Goldenberg et al. | 455/351 |
| 5,248,264 | 9/1993 | Long et al. | 439/347 |
| 5,261,583 | 11/1993 | Long et al. | 206/305 |

Primary Examiner—Henry J. Recla
Assistant Examiner—Steven O. Douglas
Attorney, Agent, or Firm—Pablo Meles; John H. Moore; Daniel K. Nichols

[57] ABSTRACT

A holster (10) for a selective call receiver having a liquid crystal display comprises a plastic housing (12) for removably retaining the selective call receiver and a substantially clear lens (14) integrally formed in the plastic housing providing protection to the display and allowing a user of the portable communication product to view the liquid crystal display while the selective call receiver is retained within the holster.

15 Claims, 1 Drawing Sheet

INTEGRATED LENS AND HOLSTER ASSEMBLY

TECHNICAL FIELD

This invention relates generally to holsters for portable electronic products, and more particularly a holster having an integrated lens.

BACKGROUND

Portable electronics, and in particular portable communication products generally have displays for providing information to the user in the form of status information or messages. Typically, portable communication products such as pagers or cellular phones use liquid crystal displays which are fragile and subject to damage from shock or impact forces on the lens. A holster may provide such protection, but typically, the holster will prevent the user from viewing the display when the communication product is engaged within the holster.

Many pagers on the existing market have belt clips directly attached to the back side of the housing of the pager. The pager is then typically clipped on to a users belt or waist seam. The user walking around with a pager equipped with a such a clip will tend to bump inadvertently into objects, subjecting the pager and the display to damage. Therefore, holsters were created having belt clips, so the user can protect the pager and display. The problem created by existing holsters, though, was that the user would need to remove pager from the holster in order to view a message or a status screen. In many instances, users would prefer to remove both the pager and the holster from their belt, waist seam, or hip to view the display. Again, the would still have to remove the pager from holster to view the display and leave the pager and display unprotected. Thus, there exists a need for a holster that provides adequate protection to a portable communication product and its display and still allows a user of the product to view the display when the product is engaged or retained within the holster.

SUMMARY OF THE INVENTION

A holster for a portable communication product having a display comprises a housing for removably retaining the portable communication product and a substantially clear lens integrally formed in the housing providing protection to the display and allowing a user of the portable communication product to view the display while the portable product is retained within the holster.

DETAILED DESCRIPTION OF THE PREFERRED EMBODIMENT

Figure 1:
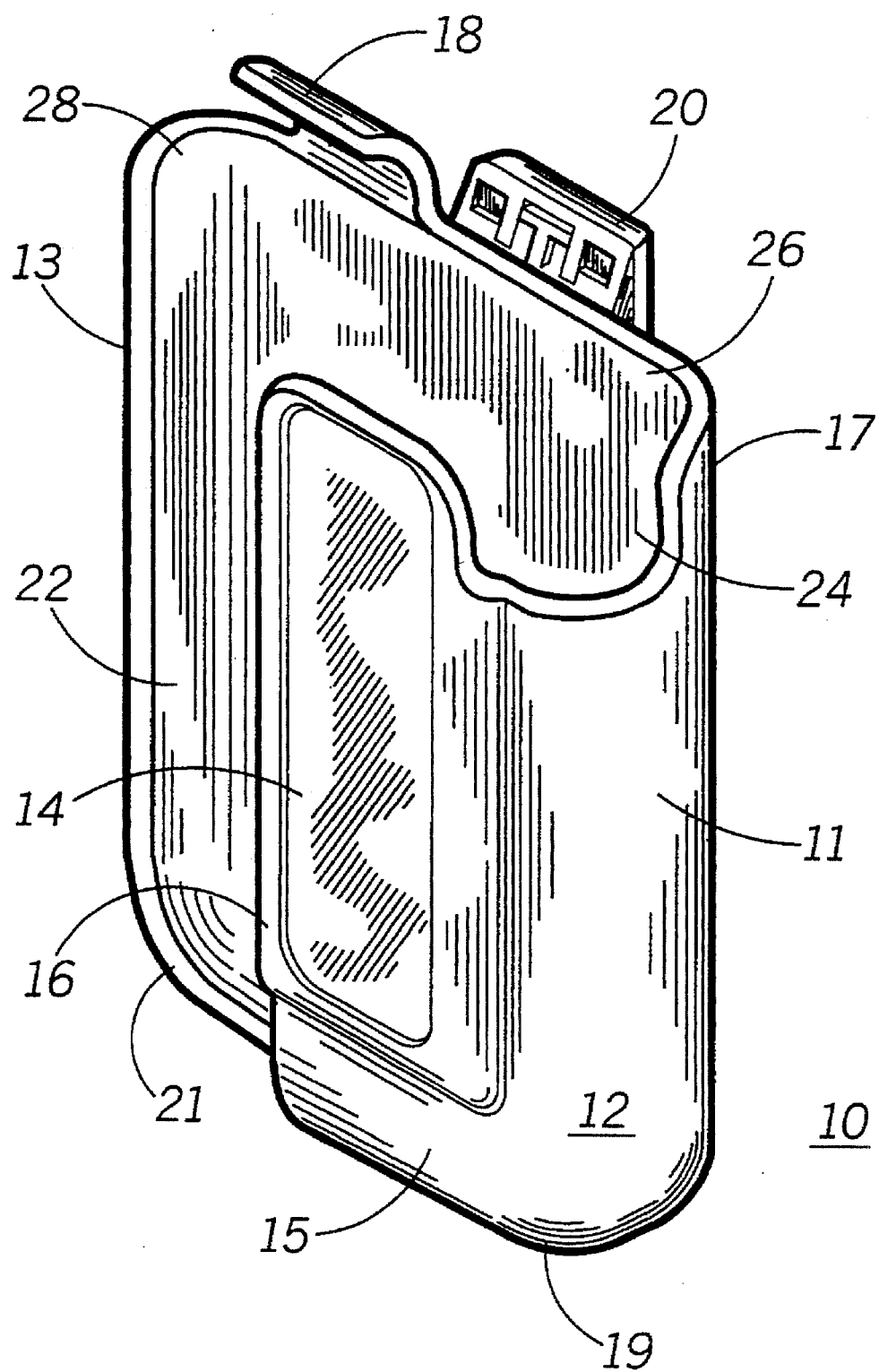
FIG. 1 is a perspective view of a holster having an integrated lens in accordance with the present invention.

Referring to FIG. 1 there is shown a perspective view of a holster 10 having an integrated lens 14 integrally formed as one piece with the housing 12 of the holster in the housing 12 of the holster. Preferably, the holster 10 is comprised of plastic or polycarbonate and retains a portable communication product such as a selective call receiver or pager having a front mounted display. The pager typically has six surfaces which need protection from shock and impact forces. The holster preferably protects a pager having a front mounted display on all six sides. Side surface 11 and side surface 13 of the holster 12 protects the left and right sides of a pager respectively. Surface 15, which includes the integrated lens 14 protects the front side of a pager. Surface 17 would protect the back side of a pager. Finally surface 18 and surface 19 would protect the top and bottom sides respectively of a pager or portable electronic product. The pager or portable electronic product slips easily into the holster because of the substantial voids 22 on the front surface, voids 24 and 28 on the side surfaces, and void 26 on the top surface of the holster. The surface 18, which is more of a protrusion extending from the back surface 17 and curving into a top surface, provides for a means for retaining the pager in place. A user would need to apply some force to the void 21 in the bottom surface (19) to urge the pager out of its mounted position within the holster. A minor force applied by a user's finger would be sufficient to disengage the pager from the holster.

With a means for attachment to the user's body such as a belt clip 20 on the holster, the user now can protect the pager and display while allowing the user to carry the pager on their belt or waist seam. Of course, there are a number of ways to attach the holster to a user's body including, but not limited to hook and loop fastener means, safety pins, push pins, and tie tacks, all of which are contemplated in the present invention. If the user wants to view the display, with the present invention, the user now has several options. The user may attempt to view the display through the substantially clear lens 14 on the holster while the pager is engaged in the holster and clipped on to a user's waist seam or belt, or alternatively, the user can remove the holster from their waist seam or belt and view the display through the lens 14 without removing the pager from holster 10. Thus, the pager and display is always protected and visible unless the user removes the pager from the holster completely. For further protection to the lens, a raised surface 16 is formed about the periphery of the lens 14. This raised surface 16 protects the lens 14 from inadvertent scratches and impacts and further protects the liquid crystal display that may be residing below the lens 14 when a display pager is retained within the holster 10. The raised surface 16 further distributes the load around the surface periphery of the liquid crystal display of the pager.

Although the invention has been described with reference to a specific embodiment, it is to be understood that numerous other arrangements in accordance with the present invention may readily be devised by those skilled in the art without departing from the spirit and scope of the invention.

What is claimed is:

1. A holster for a portable communication product having a liquid crystal display, comprising:

a one piece housing for removably retaining the portable communication product, the housing having at least two substantial voids for the easy insertion and removal of the portable communication product;

a substantially clear lens integrally formed as one piece with the housing providing protection to the display and allowing a user of the portable communication product to view the display crystal liquid behind the substantially clear lens while the portable product is retained within the holster, wherein the substantially clear lens has an integrally formed raised surface about the external periphery of the substantially clear lens.

2. The holster of claim 1, wherein the holster further comprises a means for attachment to a user's body.

3. The holster of claim 1, wherein the holster further comprises a belt clip coupled to an external portion of the housing.

4. The holster of claim 1, wherein the housing is comprised of plastic.

5. The holster of claim 1, wherein the housing is comprised of polycarbonate.

6. The holster of claim 1, wherein the substantially clear lens is located on the holster to protect a front-mounted display on a communication product.

7. A holster for a selective call receiver having a liquid crystal display, comprising:

a one piece plastic housing for removably retained the selective call receiver, the plastic housing having substantial voids on at least two surface for easy insertion and removal of the selective call receiver;

a substantially clear lend integrally formed as one piece with the plastic housing providing shock and impact protection to the display and allowing a user of the portable communication product to view the liquid crystal display behind the substantially clear lens while the selective call receiver is retained within the holster, wherein the substantially clear lens has an integrally formed raised surface about the externally periphery of the substantially clear lens.

8. The holster of claim 7, wherein the holster further comprises a means for attachment to a user's body.

9. The holster of claim 7 wherein the holster further comprises a belt clip coupled to an external portion of the plastic housing.

10. A holster for a portable paging device having a liquid crystal display, comprising:

a one piece plastic housing allowing a pager having six sides to be removably insertable and protected from shock on all six sides, the plastic housing having substantial voids for east insertion and removal of the portable paging device;

a belt clip coupled to an external portion of the plastic housing;

a substantially clear leans portion integrally formed as one piece with the plastic housing for shock and impact protecting the liquid crystal display and allowing a user to view the liquid crystal display; and raised surface about the periphery of the substantially clear lens portion providing further protection to the liquid crystal display on the pager and protection to the substantially clear lens portion.

11. The holster of claim 10, wherein the plastic housing has substantially 6 surfaces and substantially voids in at least 3 of the 6 surfaces on the holster.

12. The holster of claim 11, wherein the plastic housing has substantial voids on a from surface, a top surface, and side surface.

13. The holster of claim 10 wherein the plastic housing has substantially 6 surfaces and substantially voids in 4 of the 6 surface on the holster.

14. The holster of claim 13, wherein the plastic housing has substantial voids on a front surface, a top surface, and two sides surfaces.

15. The holster of claim 10, wherein the substantially clear lens is formed to protect a portable paging device having a front mounted display.

* * * * *

UNITED STATES PATENT AND TRADEMARK OFFICE
CERTIFICATE OF CORRECTION

PATENT NO. : 5,452,829

DATED : September 26, 1995

INVENTOR(S) : Jeffrey S. King, et al.

It is certified that error appears in the above-identified patent and that said Letters Patent is hereby corrected as shown below:

Claim 1, Column 2, line 56, after providing insert --shock and impact--.

Claim 1, Column 2, line 58, delete "display crystal liquid" and insert --liquid crystal display--.

Claim 7, Column 3, line 10, change "retained" to --retaining--.

Claim 7, Column 3, line 12, change "surface" to --surfaces--.

Claim 7, Column 3, line 14, change "lend" to --lens--.

Claim 9, Column 3, line 25, after 7 insert --,--.

Claim 10, Column 4, line 2, change "east" to --easy--.

Claim 10, Column 4, line 6, change "leans" to --lens--.

Claim 10, Column 4, line 10, before raised insert --a --.

Claim 12, Column 4, line 19, change "from" to --front--.

Claim 12, Column 4, line 20, before side surface insert --a --.

Claim 13, Column 4, line 21, after 10 insert --,--.

Claim 13, Column 4, line 22, change "substantially" to --substantial--.

UNITED STATES PATENT AND TRADEMARK OFFICE
CERTIFICATE OF CORRECTION

PATENT NO.   : 5,452,829
DATED        : September 26, 1995
INVENTOR(S)  : Jeffrey S. King, et al.

It is certified that error appears in the above-indentified patent and that said Letters Patent is hereby corrected as shown below:

Claim 13, Column 4, line 23, change "surface" to --surfaces--.

Signed and Sealed this

Second Day of April, 1996

Attest:

BRUCE LEHMAN

Attesting Officer

Commissioner of Patents and Trademarks